United States Patent [19]

Pennington

[11] Patent Number: 5,190,147
[45] Date of Patent: Mar. 2, 1993

[54] TENSIONING CAR FOR FLEXIBLE CONTINUOUS TRAM

[75] Inventor: John H. Pennington, Green River, Wyo.

[73] Assignee: General Chemical Corporation, Parsippany, N.J.

[21] Appl. No.: 700,627

[22] Filed: May 15, 1991

[51] Int. Cl.⁵ ............................................. B65G 21/00
[52] U.S. Cl. ................................. 198/861.2; 198/303
[58] Field of Search ............ 198/300, 303, 813, 861.1, 198/861.2, 812; 305/10, 31, 35 R, 35 EB, 39

[56] References Cited

U.S. PATENT DOCUMENTS

| | | | |
|---|---|---|---|
| 2,951,580 | 9/1960 | Slomer | 198/812 |
| 3,557,937 | 1/1971 | Kahre | 198/861.2 |
| 4,476,975 | 10/1984 | Densmore | 198/861.2 |
| 4,852,724 | 8/1989 | Bodimer | 198/861.2 |
| 4,865,185 | 9/1989 | Bodimer | 198/861.2 |

Primary Examiner—Joseph E. Valenza
Assistant Examiner—Tuan N. Nguyen
Attorney, Agent, or Firm—Brumbaugh, Graves, Donohue & Raymond

[57] ABSTRACT

A tensioning car for a flexible continuous tram comprises a center beam structure adapted to support a segment of the transport belt and a pair of side beam structures, one on each side of the center beam structure and each having coupling devices for coupling it to an adjacent car of the tram. Guide bars join the side beam structures for limited movement relative to each other lengthwise of the tram and also support the center beam structure. Chain guides on each of the beam structures guide the crawler chain of the tram. A pair of hydraulic piston/cylinders, one adjacent each end of the tensioning car, are coupled between the side beam structures. A constant pressure accumulator connected to each cylinder supplies a hydraulic fluid under a substantially constant pressure to the respective cylinder so that the cylinders urge the side beam structures resiliently away from each other and thereby maintain a generally constant tension in the crawler chain.

3 Claims, 4 Drawing Sheets

TENSIONING CAR FOR FLEXIBLE CONTINUOUS TRAM

BACKGROUND OF THE INVENTION

It is common in the mining field to transport material through the bore panel of a mine on a flexible continuous tram (FCT). FIGS. 1 and 2 illustrate a known FCT. The mined material is transported by a continuous transport belt that runs on rollers supported on column supports above transverse beam structures. The beam structures and column supports are components of cars that are coupled together to form a train, which may be as much as 550 feet long. Each car includes guides for an endless crawler chain that is driven by sprockets associated with drive cars of the tram and carries transverse crawler pads that enable the entire tram to be moved periodically as the mining progresses. Commonly, the tram is moved every three days or so.

The tram is assembled in sections of, say, 60 feet in length, each section consisting of numerous standard cars, a drive car at each end and a takeup car that enables the length of the section to be adjusted in order to maintain a desired tension in the chain. The takeup car consists of a center beam structure on which a segment of the transport belt is supported and a side beam structure on either side of the center beam structure that is connected to the center beam structure by large bolts. Adjustment of the takeup car is accomplished manually by loosening the bolts, setting the desired chain tension using portable hydraulic jacks inserted between the two side beam structures on each end of the car, inserting shims between one or both side beam structures and the center beam structure and tightening the nuts on the bolts that join the beam structures. Once the tension has been set by adjusting the take-up car, the actual tension in the chain can vary significantly due to changes in the relative positions of the cars, such as negotiating a turn in the mine panel.

The tension in the crawler chain is very critical. If the chain is allowed to run too loose, the rate of wear of the chain guides of the drive units (which are highly subject to wear in all events) is greatly increased. If the chain is too tight, the chain guides of the drive unit are very prone to braking. Each time that a chain guide of a drive unit has to be changed because of wear or breakage, the FCT to be taken out of operation to replace the guide, which requires three mechanics working for up to twelve hours to make the repair. Running the tram with the crawler chains too loose can also result in chain links becoming balled up in a guide somewhere and in breaking of the chain. Replacing a broken chain can take as much as 24 hours. The costs of running an FCT with improper tension in the while the repairs are made, is, obviously, considerable.

SUMMARY OF THE INVENTION

An object of the present invention is to provide a means for maintaining the proper tension in the crawler chains of an FCT at all times. A further object is to increase the magnitude of the possible take-up of each FCT crawler section. Yet another object is to allow proper crawler chain tension to be maintained with a minimum of operator intervention.

The foregoing and other objects are attained, according to the present invention, by a tensioning car for a flexible continuous tram of the type having sections composed of a multiplicity of cars coupled together for limited articulation relative to each other and supporting an endless transport belt, and an endless chain having transverse crawler pads affixed to it, guided through chain guides on the cars, and driven by drive cars at each end of the section periodically to move the tram along a mine tunnel. According to the invention, the tensioning car comprises a center beam structure adapted to support a segment of the transport belt and a pair of side beam structures, one on each side of the center beam structure and each having coupling devices for coupling it to an adjacent car of the tram. Guide bars join the side beam structures for limited movement relative to each other lengthwise of the tram and also support the center beam structure. Each of the beam structures has chain guides that guide the crawler chain. Each of a pair of hydraulic piston/cylinders, one adjacent each end of the tensioning car, is coupled between the side beam structures, and a constant pressure accumulator is connected to each cylinder and supplies a hydraulic fluid under pressure to the respective cylinder so as to urge the side beam structures away from each other and thereby maintain a generally constant tension in the drive chain.

Preferably, each hydraulic piston/cylinder is coupled to the respective side beam structures by a coupling device that includes a spherical bearing so that the side beams structures may skew relative to each other. In a preferred embodiment, moreover, the guide bars that join the beam structures pass through holes in the beam structures, and each bar has a stop abutment at each end engageable by the respective side beam structures to limit the spacing between them lengthwise of the tram.

In a tensioning car embodying the present invention, the constant pressure accumulators continuously pressurize the respective piston/cylinder, which, accordingly, applies a substantially constant biasing force on the side beam structures. Those forces are applied equally and oppositely to the adjacent cars of the tram and are ultimately transmitted along the entire tram section from car to car, thereby maintaining a generally constant tension in the crawler chain. This feature is particularly desirable when the tram negotiates a turn in the bore panel, which requires distance give-up on the inside of the curve and distance take up on the outside of the section, as compared to their lengths when the FCT is straight. In this case, the hydraulic fluid in the accumulator on the outside of the curve is forced under the generally constant pressure into the outside piston/cylinder, and the fluid is forced back out of the inside piston/cylinder back into its accumulators, thereby accommodating the articulations of the cars without significantly changing the tension in the crawler chain. When the section straightens again, the automatic adjustment process is reversed. Under all conditions, the tensioning car responds to changes in the relative positions of the cars that alter the tension in the crawler change by taking up or giving up space in the train of cars making up the FCT section that would otherwise significantly change the tension in the chain.

The tensioning car also increases the magnitude of the possible take-up or give-up in the length of the train of cars required to maintain the desired chain tension. The takeup car allows about seven inches of take-up in the tram section. The addition of the tensioning car adds another eight inches of take-up.

For a better understanding of the invention, reference may be made to the following description of an exem-

DESCRIPTION OF THE EMBODIMENT

Figure 1:
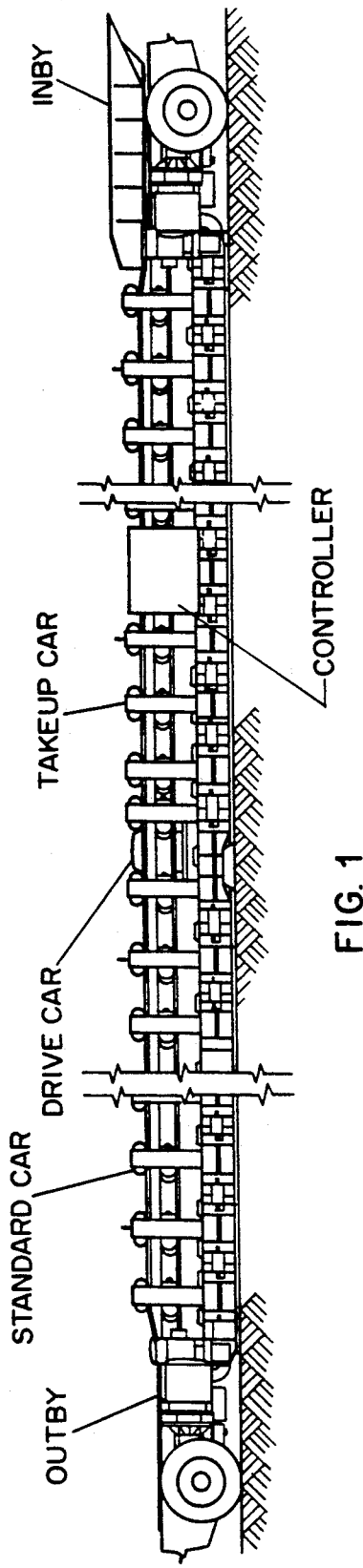
FIG. 1 is a side elevational view, with portions broken away, of a known FCT.
Figure 2:
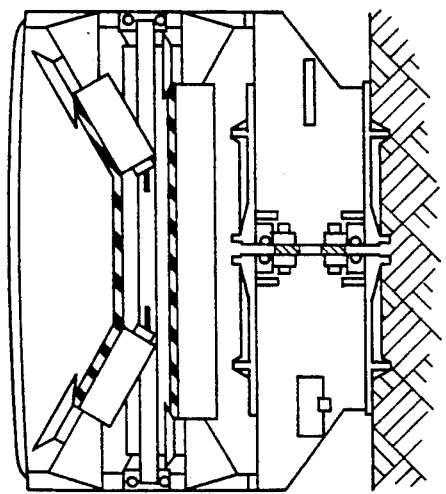
FIG. 2 is an end view of a standard car of the FCT of FIG. 1.
Figure 3:
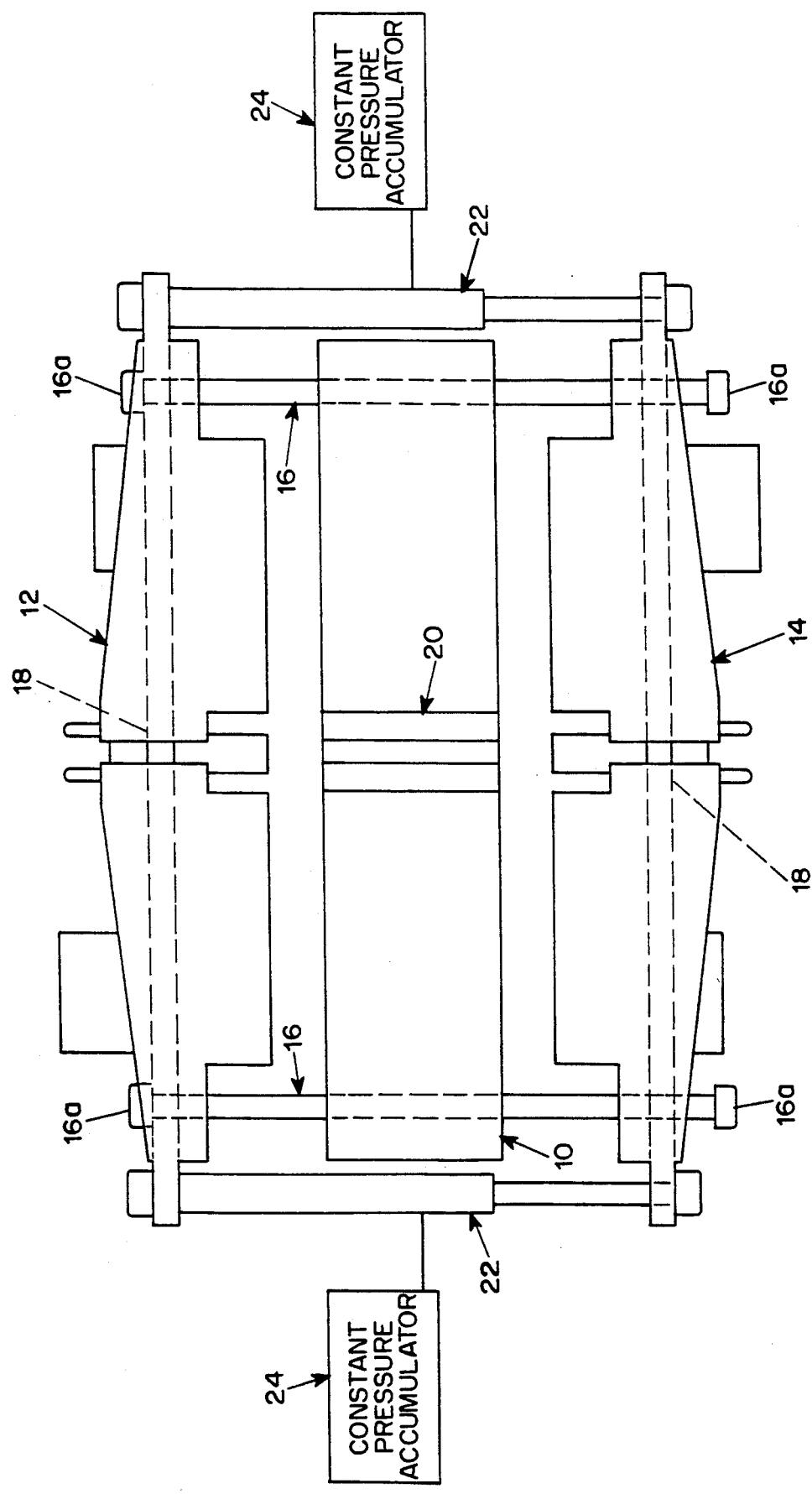
FIG. 3 is an exploded and simplified bottom plan view of an embodiment of a tensioning car according to the present invention.

Referring first to FIG. 3, the tensioning car comprises a center beam structure 10, which is adapted to support a segment of the transport belt by means of columns bolted onto it at each end (not shown, but see FIGS. 1 and 2), and a pair of side beam structures 12 and 14, one on each side of the center beam structure and each having coupling elements (described below) for coupling it to an adjacent car of the tram. The side beam structures 12 and 14 are identical but are reversed end for end, relative to each other so that corresponding aspects face outwardly away from the center beam structure. Guide bars 16 join the side beam structures for limited movement relative to each other lengthwise of the tram and also support the center beam structure. Chain guides 18 and 20 on each of the beam structures guide the crawler chain. Hydraulic piston/cylinders 22, one adjacent each end of the tensioning car, are coupled between the side beam structures, and a constant pressure accumulator 24 connected to each cylinder maintains a substantially constant fluid pressure in a hydraulic fluid in the respective cylinder such that the cylinder urges the side beam structures resiliently away from each other, thereby maintaining a generally constant tension in the crawler chain.

Figure 4:
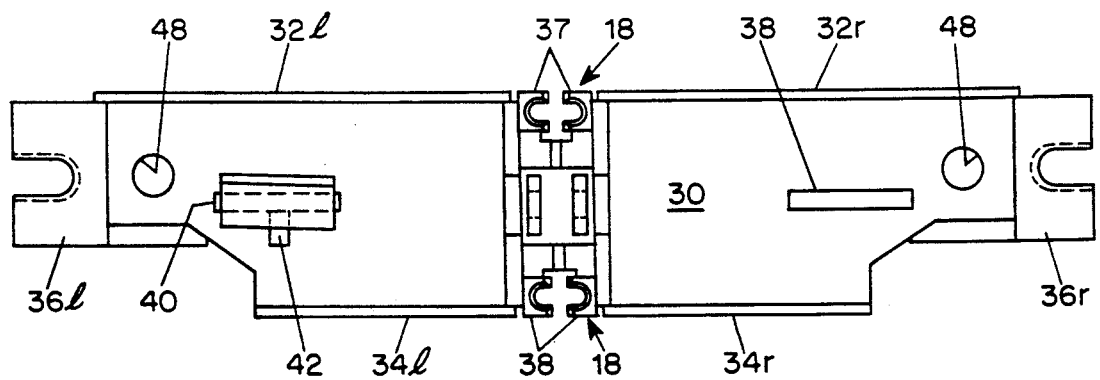
FIG. 4 is an elevational view of a side beam structure of the embodiment, looking at the aspect that faces away from the center beam structure.
Figure 5:
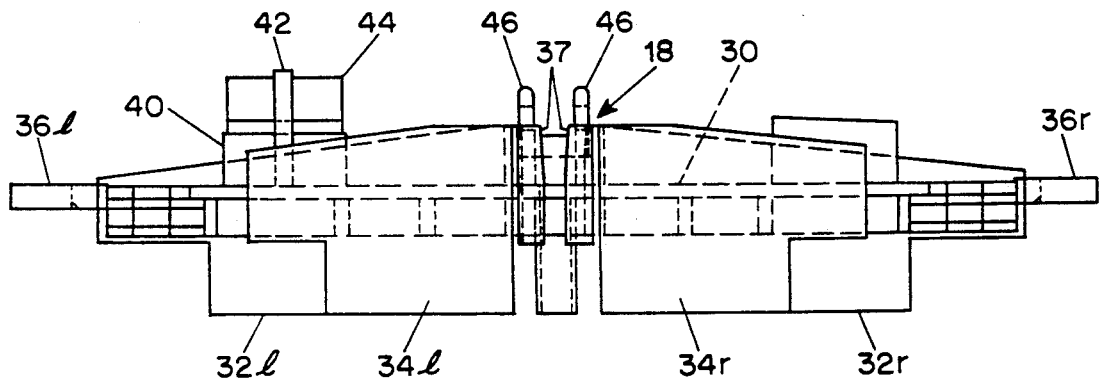
FIG. 5 is a bottom plan view of the side beam structure.
Figure 6:
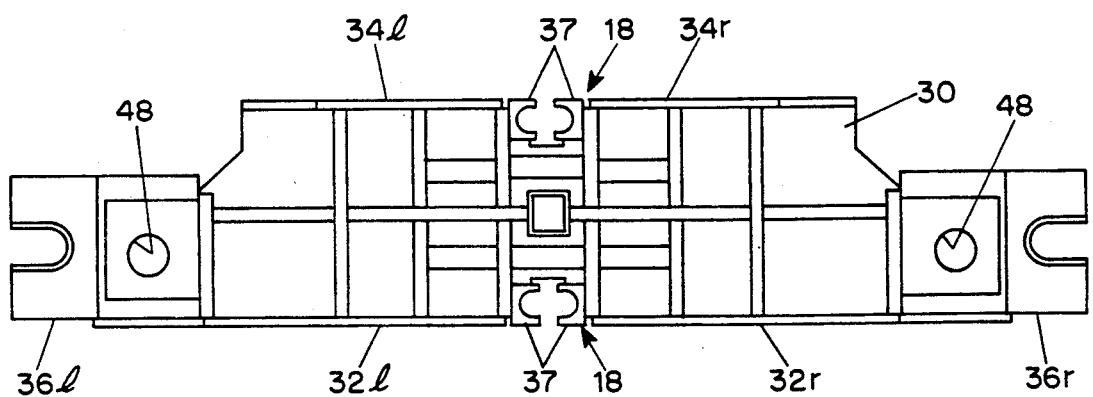
FIG. 6 is an elevational view of the aspect of the side beam structure that faces toward the center beam structure.

The two identical side beam structures 12, 14 (see FIGS. 4 to 6) are, basically, I-beams built up by welding from various members cut from steel plate. The principal members are a foundation or web plate 30, top plates 32*l* and 32*r*, and bottom plates 34*l* and 34*r*. Vertical and horizontal stiffeners, which need not be described or given reference designations, stiffen and strengthen the beam structures. Saddles blocks 36*l* and 36*r* welded to the ends of the web plate 30 provide attachment points for the hydraulic cylinders. Upper and lower pairs of C-shaped chain guide members 37 form the guides 18 for the crawler chain. The side beam structures have standard coupling elements for interconnecting the tensioning car to other cars of the train, namely: a right rib 38, a left rib 40, a left rib support 42, an angle 44 and two coupling eyes 46. The details of these coupling elements and how they function are well-known in the art, and it is not necessary, therefore, to elaborate on them here other than to observe that they couple the cars in a manner that allows them to move and to articulate relative to each other to limited extents vertically and horizontally. Holes 48 near each end of the web plate receive the respective guide bar 16.

Figure 7:
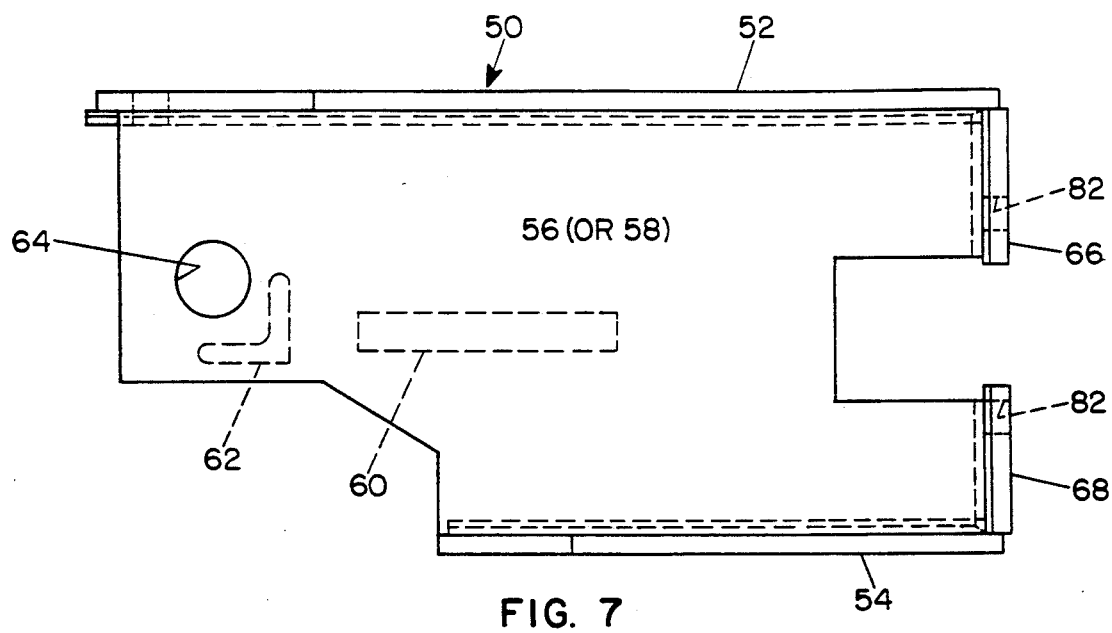
FIG. 7 is an elevational view of one end section of the center beam structure of the embodiment.
Figure 8:
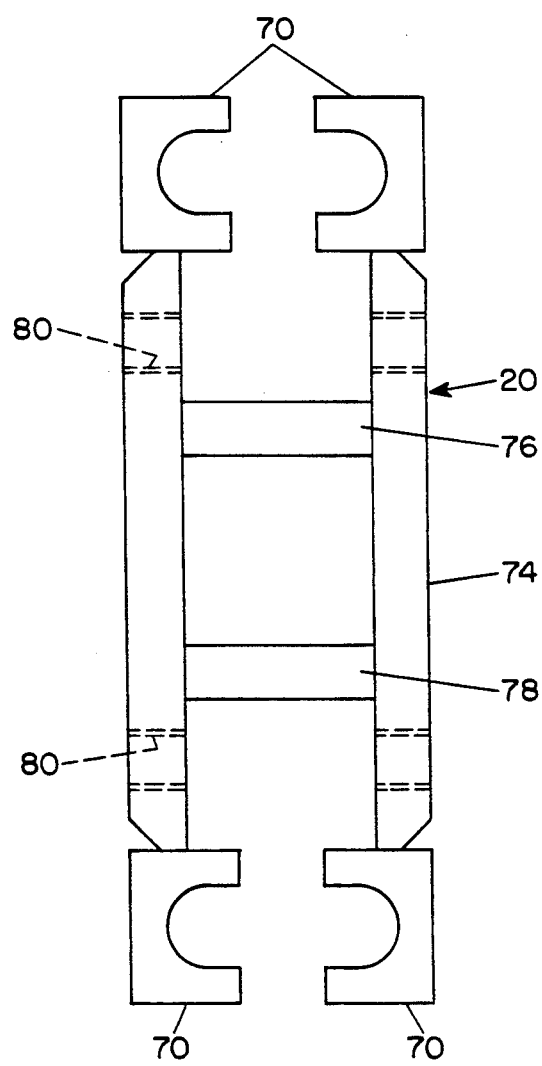
FIG. 8 is an elevational view of the chain guide section of the center beam structure and is on a larger scale than is FIG. 7.

The center beam structure 10 (see FIGS. 7 and 8) is made up of a pair of identical end sections 50, each of which is essentially a box beam, and the previously mentioned chain guide section 20. Each end section includes a top plate 52, a bottom plate 54, front and rear side plates 56 and 58 (latter not shown, except that FIG. 7 may be regarded as showing the mirror image of the section as well as the section shown), a side support plate 60 and a side support angle 62 (the latter two members extending cross-wise between the side plates 56 and 58). Aligned holes 64 near the outer ends of the side plates receive the respective guide bar 16 of the car.

The guide section 20 of the center beam structure consists of two pairs of C-shaped guide members 70, which form upper and lower guides for the crawler chain, side plates 72 and 74 and upper and lower side supports 76 and 78. Holes 80 in the side plates 72 and 74 and matching holes 82 in upper and lower end plates 66 and 68 (FIG. 7) of the ends sections 50 receive bolts (not shown) by which the end sections 50 are fastened to the guide section 20.

Figure 9:
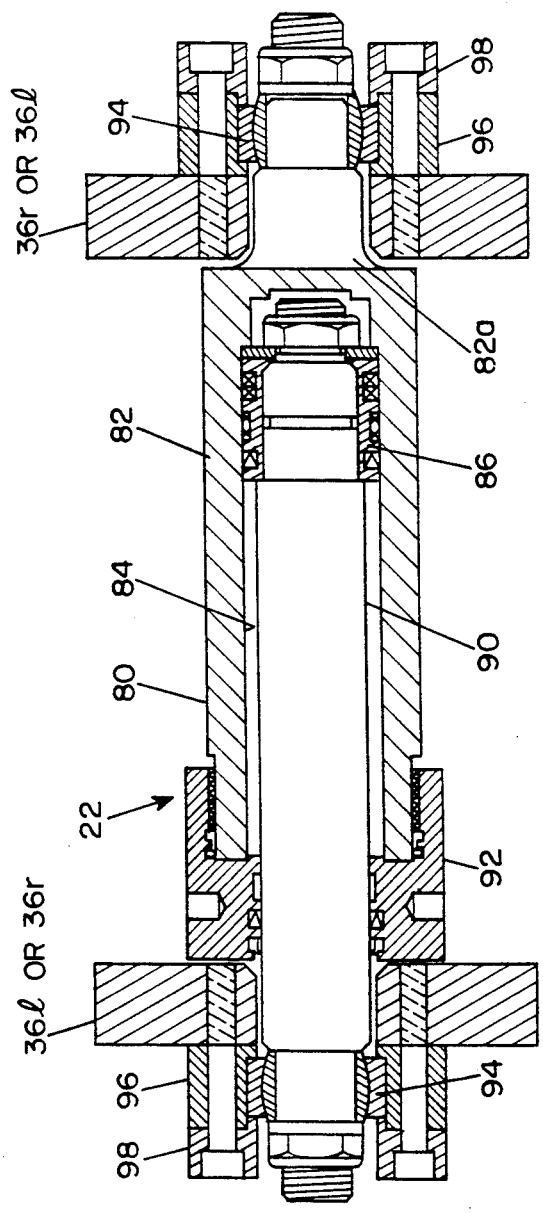
FIG. 9 is an axial cross-sectional view of a hydraulic cylinder of the embodiment.

The hydraulic piston/cylinders 22 (FIG. 9) are composed of a barrel 80 and a closed end member 82 defining a chamber 84 and a piston 86 received in sliding relation within the barrel, sealed to the barrel wall by sealing rings, and affixed to the end of a piston rod 90. The rod extends out of the chamber through a gland 92. A mounting shaft portion 82*a* on the end member 82 and the outward end of the piston rod 90 are joined to the saddle blocks 36*l*, 36*r* of the respective side beam structures 12 and 14 of the car by spherical bearings 94, which are carried by bearing mounts 96 that are fastened to the saddle blocks by bearing retainers 98 bolted to the saddle blocks. The spherical bearings permit the piston/cylinders to articulate omnidirectionally relative to the side beam structures 12 and 14 upon skewing of the beam structures.

The portion of the chamber 84 between the piston 86 and the closed end member 82 contains a hydraulic fluid, preferably grease, that is maintained under a generally constant pressure by the accumulator 24. The accumulator is a pressure vessel that contains the grease and a rubber bladder that contains a gas, such as nitrogen, under a pressure, which may be of the order of 1000 psi, such as to establish a desired biasing force in the piston/cylinder by pressurizing the grease. Because the gas in the bladder is compressible, the biasing force varies somewhat, but the force of the cylinder due to the grease pressure is sufficiently constant to have the desired effect of maintaining the crawler chain within a range of tightness such as to minimize wear in the guides of the drive cars, prevent links from getting balled up in guides and prevent breakage of guides or the chain. The pressure of the grease may be monitored by a pressure gage on the accumulator and may be adjusted from time to time, as required, by bleeding off grease from or adding grease to the accumulator through a grease zerk. An over-pressure condition is avoided by a relief check valve on the accumulator.

As the geometry of each of the FCT sections equipped with a tensioning car changes, the tensioning car responds by automatically taking up or giving up space on each side of the tensioning car, i.e., changing of the distances between both ends of the tensioning car. When space is given up, grease is forced out of the piston/cylinder back into the accumulator; when space is taken up, grease is forced out of the accumulator into the piston/cylinder.

FIG. 3, for clarity, shows the side beam structures separated from the center beam structure. In the assembled condition, the two side beams structures telescopically receive the center beam structure; the top and bottom plates of the side beam structures overlap (by a varying extent) the top and bottom plates of the center beam structure. The maximum spacing between the side beam structures is limited by stop heads 16a on the ends of the connecting rods 16; the minimum distance is established by contact between the side plates of the center beam structure and the stiffener plates on the inside surfaces of the webs of the side beam structures.

I claim:

1. A tensioning car for a flexible continuous tram having a multiplicity of cars coupled together for limited articulation relative to each other and supporting an endless transport belt, and an endless crawler chain having transverse crawler pads affixed to it, guided through chain guides on the cars, and adapted to be driven periodically to move the tram along a mine tunnel, comprising a center beam structure adapted to support a segment of the transport belt, a pair of side beam structures, one on each side of the center beam structure and each having coupling means for coupling it to an adjacent car of the tram, guide means joining the side beam structures for limited movement relative to each other lengthwise of the tram and also supporting the center beam structure, chain guides on each of the beam structures adapted to guide the crawler chain, a pair of hydraulic piston/cylinders, one adjacent each end of the tensioning car, coupled between the side beam structures, and a constant pressure accumulator connected to each cylinder and supplying a hydraulic fluid under a substantially constant pressure to the respective cylinder so that the cylinders urge the side beam structures away from each other and thereby maintain a generally constant tension in the crawler chain.

2. A tensioning car according to claim 1 wherein each hydraulic cylinder is coupled to the respective side beam structures by a coupling means that includes a spherical bearing so that the side beams structures may skew relative to each other.

3. A tensioning car according to claim 1 wherein the guide means includes a pair of spaced-apart bars passing through holes in the beam structures, each bar having a stop abutment at each end engageable by the respective side beam structures to limit the spacing between them lengthwise of the tram.

* * * * *